United States Patent [19]
Shipman

[11] Patent Number: 4,569,161
[45] Date of Patent: Feb. 11, 1986

[54] PNEUMATIC POWDER METERING APPARATUS WITH IMPROVED POWDER THROTTLING MECHANISM

[75] Inventor: Douglas L. Shipman, Piscataway, N.J.

[73] Assignee: Pennwalt Corporation, Philadelphia, Pa.

[21] Appl. No.: 548,270

[22] Filed: Nov. 3, 1983

[51] Int. Cl.⁴ .............................................. B24C 7/00
[52] U.S. Cl. ........................................ 51/436; 51/438; 406/134; 406/144; 251/121; 251/205; 251/267
[58] Field of Search .......... 51/436, 438, 410, 319–321, 51/427; 222/161, 196; 406/134, 144, 146; 251/121, 205, 267

[56] References Cited

U.S. PATENT DOCUMENTS

| | | | |
|---|---|---|---|
| 2,524,919 | 10/1950 | Meincke | 406/144 |
| 2,766,558 | 10/1956 | Black | 222/161 |
| 2,778,223 | 1/1957 | Kimbrell | 251/267 |
| 3,563,421 | 2/1971 | Coates et al. | 222/196 |
| 3,618,263 | 11/1971 | Weijsenburg | 51/436 |
| 4,067,150 | 1/1978 | Merrigan | 51/436 |
| 4,381,898 | 5/1983 | Rotolico et al. | 406/144 |
| 4,482,322 | 11/1984 | Hain et al. | 51/436 |

OTHER PUBLICATIONS

Renken, H. H., "Dual Control Metering Valve", IBM Technical Disclosure Bulletin, vol. 17, No. 11, Apr. 1975.

Primary Examiner—Frederick R. Schmidt
Assistant Examiner—Robert Rose

[57] ABSTRACT

A gap is formed between a small diameter powder feed supply orifice and a throttling "needle" which is flattened at its working tip end. The needle is vertically adjustable to vary size of the gap. The powder is a finely divided abrasive material which is delivered to a handpiece in the form of a powder/air mixture for use in abrasive jet machining operations, for example. The powder throttling mechanism cooperates with pressurized air directed at the gap from an internal nozzle to entrain the powder for the mixture. The apparatus is vibrated by a ball and raceway mechanism, the ball being propelled therearound by pneumatic pressure. The apparatus is compact; easy to maintain, operate and clean; and requires no electrical power source of any kind.

6 Claims, 5 Drawing Figures

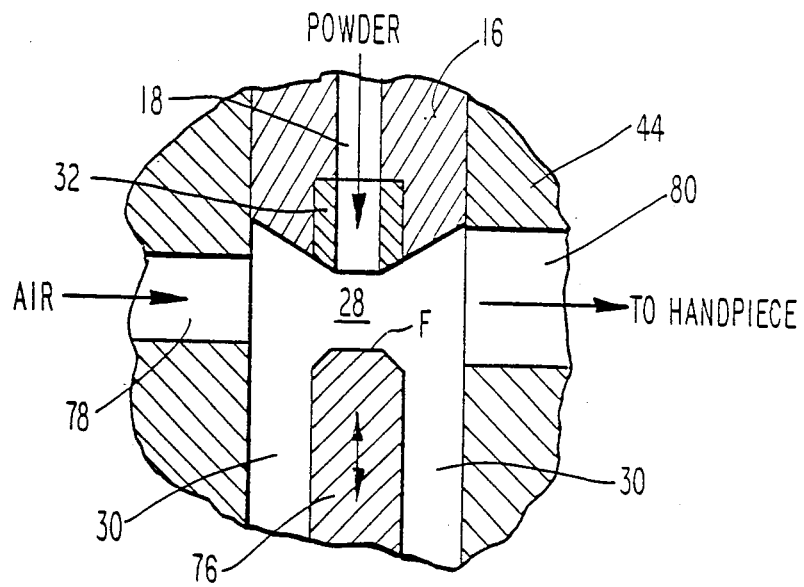
_Fig. 4_
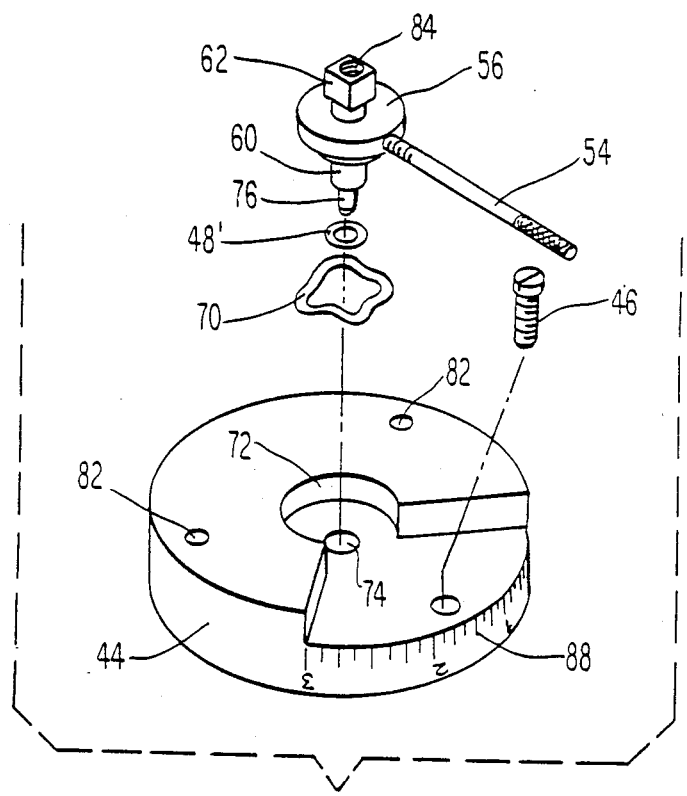
_Fig. 5_

PNEUMATIC POWDER METERING APPARATUS WITH IMPROVED POWDER THROTTLING MECHANISM

STATEMENT OF THE INVENTION

The present invention relates to apparatus for the controlled continuous metering of dry powder for use in abrasive jet machining applications and the like.

BACKGROUND AND SUMMARY OF THE INVENTION

Abrasive jet machining may be defined as the removal of material through the reaction of a focused, high velocity stream of fine grit or powder-loaded air. Basic apparatus for carrying out the abrasive jet machining process may include an air or gas supply, a pressurized powder reservoir with cooperating vibrating means, a mixing chamber, and a conduit for feeding the resultant powder to a hand held piece having an appropriate nozzle for directing the powder-air mixture against a workpiece for delicate removal of portions thereof. A foot or remote switch may control the air pressure at the nozzle. The pulsation of the vibrating means or the positive pressure within the powder reservoir urges the powder through a nozzle orifice or passageway to contact a pressurized air stream or jet. The amount of powder delivered is dependent upon the amplitude of vibration, pressure of the delivery system, diameters of the handpiece nozzle and power feed supply orifice or passageway, and size of powder, among other factors.

The abrasive powder, such as aluminum oxide and silicon carbide, for example, should be well classified and clean, and typically ranges in size from about 10 to 150 microns in diameter.

Abrasive jet machining is not a mass material removal process, but one of finishing. Because of the small amount of abrasive powder flowing through the handpiece nozzle at any given instant, it is not difficult to remove selected portions of the workpiece.

Current powder throttling mechanisms have a tendency to produce unreliable powder flow rates resulting in an excess or deficiency of grit or abrasive powder particles in the powder-air mixture and do not automatically adjust powder flow rate to maintain an acceptable or desirable proportion of powder in the entrained air powder stream or mixture.

The present invention provides a powder metering apparatus having an improved powder throttling mechanism for precisely metering powders for use in abrasive jet machining processes and automatically adjusts powder flow to provide proper proportions of entrained powder in the air-powder mixture.

More specifically, when powder flow rates are excessive for a given handpiece nozzle diameter, clogging of the nozzle frequently results. Conversely, an inadequate powder flow rate results in a decrease of cutting or removal efficiency. Because the powder delivery rate of the powder throttling mechanism of the present invention is dependent in large part upon the air velocity passing through the gap, which velocity at a given pressure is dependent upon diameter of the handpiece nozzle, the ratio of entrained powder to air mixture remains substantially constant, thereby preventing the aforementioned excesses or inadequacies.

The apparatus is substantially cylindrical, measures about 6" high with a 4" diameter, making it readily portable, and is reliable, inexpensive to fabricate and maintain, requires no electrical power source of any kind, and its throttling mechanism is readily adjustable to accommodate all powder flow rates employed in conventional abrasive jet machining operations. The apparatus requires a pneumatic power source for driving a ball around a raceway to produce controlled vibrations, and for issuing a continuous jet stream of air to be directed at the gap, i.e., the space between the outlet of the powder feed supply orifice and the throttling "needle", which needle must be substantially flat at its uppermost or tip portion. If the throttling needle is made conventional to project into the powder feed orifice, clogging of powders at the annular gap formed thereby would be commonplace.

BRIEF DESCRIPTION OF THE DRAWINGS

FIG. 4 is an enlarged fragmentary sectional view of the throttle mechanism assembly illustrated in FIG. 1.

FIG. 5 is a partially exploded inverted perspective view of the throttling mechanism assembly of the present invention.

DETAILED DESCRIPTION OF THE INVENTION

Figure 1:
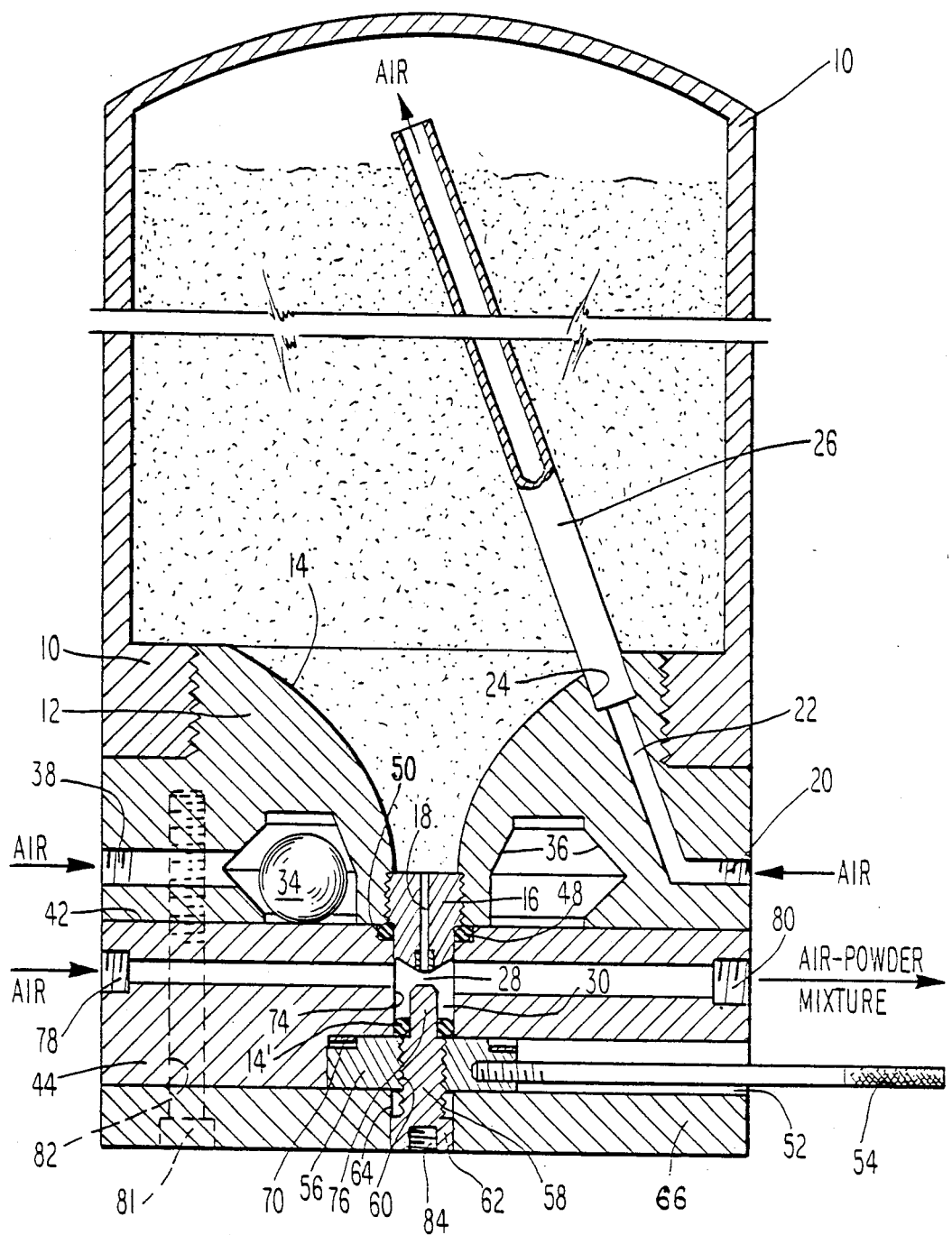
FIG. 1 is a longitudinal sectional view of the improved metering apparatus of the present invention.

In FIG. 1, the present metering apparatus includes a pressurizable powder container or hopper 10 of suitable material, threaded to a dispensing member 12, having a centrally disposed funnel shaped portion 14 for directing the powder from hopper 10 into a plug 16 provided with a small diameter powder feed supply orifice 18 axially therethrough. Orifice 18 is provided with a slight flare at its upper end. Plug 16 may be threadedly mounted, as shown, to dispensing member 12 at a lower portion thereof, but may be conveniently force fitted thereinto.

Pressurized air enters dispensing member 12 at air inlet 20, preferably threaded as shown. The pressurized air enters hopper 10 via bore 22, communicating between inlet 20 and outlet 24. A tube 26, inserted into and mounted to outlet 24, formed conveniently in a wall of funnel 14, transmits the pressurized air to an upper portion within powder hopper 10 to equalize pressure within hopper 10 and chamber 30. Upon actuation of the handpiece by means of a conventional valve, powder present in gap 28 is entrained in the air stream passing therethrough from internal nozzle 78. It must be appreciated that no powder will flow through orifice 18 until the conventional handpiece valve is actuated, which simultaneously allows flow of air from internal nozzle 78 to pass into gap 28, thereby entraining the powder present therein to flow through outlet 80, disposed in needle valve assembly support plate 44, and into the conventional handpiece (not shown) connected to the outlet 80. In the absence of air flow from internal nozzle 78, powder already present in gap 28 prevents further flow of powder thereinto from hopper 10. Handpieces are conventional in abrasive jet machining operations and are shown and described in U.S. Pat. No. 3,516,204, and U.S. Pat. No. 3,534,503, both assigned to the present assignee and incorporated by reference herein.

Gap 28 is axially disposed within chamber 30 (FIG. 4). Plug 16 may optionally be provided with a wear-resistant carbide insert 32.

Figure 3:
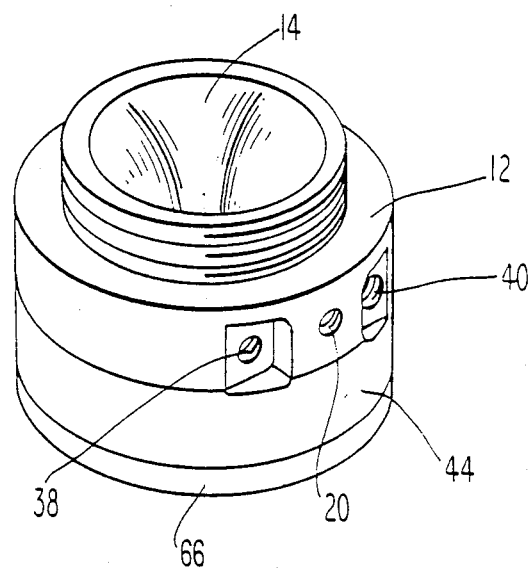

A vibrator in the form of a ball and raceway is incorporated in dispensing member 12. More specifically, a ball bearing 34 is caused to travel around a circular raceway 36 disposed at a central lowermost portion of dispensing member 12. Ball bearing 34 is propelled around raceway 36 by air which enters threaded inlet 38, passes around the raceway, and exits at outlet 40 (FIG. 3).

The resultant vibration of the powder hopper 10 by the ball and raceway mechanism prevents undesirable piping and arching of powder within the hopper. Piping and arching are typical occurrences associated with non-dynamic hopper-type dispensing mechanisms.

Ball bearing 34 travels around raceway 36 upon the upper surface 42 of needle valve assembly support plate 44, held flush against dispensing member 12 by screw 46 (FIG. 5). An O-ring 48, disposed in a central annular recess 50 provided in upper surface 42 of support plate 44, prevents air from escaping from or into raceway 36.

Figure 2:
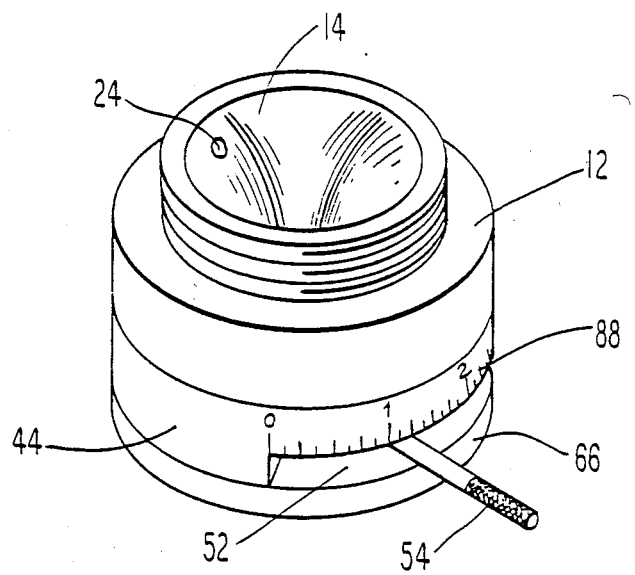
FIGS. 2 and 3 are front and rear perspective views respectively of the metering apparatus of the present invention, hopper not shown.

Support plate 44 has a generally pie-shaped segment (FIG. 5) removed to form a slotted horizontal opening 52 (FIGS. 1 and 2) for movement therein of control lever 54. Control lever 54 is threadedly attached to an internally threaded adjusting collar 56 at a peripheral portion thereof. Collar 56 threadedly receives throttling needle 58, exteriorly threaded at an intermediate portion 60, which needle is provided with a head 62, typically square, for reception by a mating square bore 64 (FIG. 1) disposed centrally through base plate 66. Thus, rotation or movement of control lever 54 within slotted horizontal opening 52 causes throttling needle 58 to move uninhibited vertically since head 62 is restrained only from rotational movement.

A wave spring 70 is received within a segmented bore 72 (FIG. 5). Wave spring 70 continuously urges adjusting collar 56 against base plate 66 notwithstanding screw 46 maintains dispensing member 12 and needle valve assembly support plate 44 in flush contact.

Segmented bore 72 does not completely penetrate needle valve assembly support plate 44, the bore 72 depth being coextensive with the plate 44 thickness where the pie-shaped segment has been removed to form horizontal opening 52, which removed pie-shaped segment also defines the segmented boundaries of bore 72.

Another bore 74 is provided centrally of the needle valve assembly support plate 44 for permitting tip 76 and the threaded portion 60 of throttling needle 58 to move vertically therein. Bore 74 defines the diameter of chamber 30.

Throttling needle 58 is not a conventional needle, since its tip 76 is flattened at F, as shown in FIG. 4. Conventional throttling needles are generally acceptable for metering materials such as sand, for example, in relatively large quantities, but are completely unacceptable for the small quantities, i.e., about 0.2 to 50 grams per minute of finely divided abrasive powder, typically 10 to 150 microns in diameter, contemplated by the present invention. Conic needle valve and orifice concentricity is absolutely essential for abrasive jet machining operations, which concentricity is virtually impossible of obtaining and/or maintaining and/or duplicating in applications employing the aforementioned abrasive powder quantitites and sizes. The flattened portion F of tip 76 of needle 58 is sufficiently large in diameter to prevent it from penetrating into orifice 18.

The type and particle size of abrasive powder being metered, air pressure at the hopper and internal nozzle, size of the gap and chamber, diameters of the powder feed orifice and handpiece nozzle, and internal diameter of the internal nozzle, among other variables, should be considered if optimum performance from the present apparatus is to be achieved.

Typically, if a handpiece nozzle is 0.032" in diameter and the diameter of interior nozzle 78 is only 0.025", for example, the pressure drop across nozzle 78 could easily result in inadequate pressure at the handpiece. If the internal nozzle diameter is now increased to 0.080", for example, insufficient air velocity at gap 28 could easily result, thus permitting undesirable powder build-up thereat. Inlet ports 78 and 20 receive air from a common pressurized source.

Plug orifice 18 diameter contemplated by the present invention is about 0.058". Gap space 28, i.e., the distance between the lowermost portion of orifice 18 and tip F of throttling needle 58 may conveniently measure between about 0.001" to 0.012". Gap 28 determines the rate of powder entrainment for a given air velocity.

Even if the gap space between orifice 18 and tip 76 is very small, chamber 30 is sufficiently large in diameter to permit air from internal nozzle 78 to easily pass around tip 76. To prevent air from escaping through throttling needle 58 from chamber 30, a suitable seal such as an O-ring 48' may be provided around tip 76. As aforementioned, O-ring 48 prevents escape of air into and from raceway 36, and also functions to prevent air from escaping upwardly from chamber 30.

Screws 81 maintain base plate 66 against needle valve assembly support plate 44 by engaging threads in dispensing member 12 after passing through unthreaded bores 82 in support plate 44.

Optionally, head 62 may be provided with internal threads 84 for receiving threaded control lever 54 for initial or coarse adjustment of the needle valve. Of course, square bore 64 of base plate 66 will be disengaged from head 62. Head 62 may also be turned, when so disengaged, by the fingers or suitable tool.

The present apparatus is conveniently supported by suitable apparatus (not shown) permitting it to be quickly inverted for easy removal of the hopper for filling, or for cleaning the mechanism of the apparatus.

Movement of control level 54 from one side of slotted horizontal opening 52 to the other causes the throttling needle to move upwardly or downwardly about 0.012". While control lever 54 is rotatable about 90° in the slotted horizontal opening 52 of FIG. 4, the invention contemplates a smaller arc with or without coarser threads on the adjusting collar 56 and throttling needle 58.

In operation, after hopper 10 is filled with abrasive powder of desired type and particle size, supply air connection is made to air inlet 20 for equalizing pressure within hopper 10 and chamber 30, and a second air supply connection is made to the ball and raceway mechanism. Air supplied to the hopper and internal nozzle may approach about 125 psi whereas the air pressure to the ball and raceway mechanism will normally be maintained below about 50 psi.

Movement of lever 54 provides fine adjustment of gap size for controlling the metering of powder into the gap. A scale 88 on the needle valve assembly support plate 44 is provided to aid in controlling the gap size by permitting control lever 54 to be accurately positioned.

I claim:

1. Powder metering apparatus for metering powder to a nozzle of a conventional handpiece used in an abrasive jet machining device and the like, said metering apparatus being substantially cylindrical and comprising a hopper for containing said powder, a powder dispensing member mounted to said hopper in powder receiving relationship thereto, said dispensing member having an axially disposed powder feed orifice at a lowermost portion, a needle valve assembly support plate mounted to an underside of said dispensing member, said support plate having a central bore therethrough, said central bore receiving said powder feed orifice at an upper portion thereof and a throttling needle at a lower portion thereof to form a spaced gap therebetween, said central bore forming a chamber embracing said spaced gap, said throttling needle flattened at its tip or uppermost portion to provide a diameter thereat larger than opening of said powder feed orifice, said throttling needle including an exteriorly threaded portion below its flattened tip and a non-circular head at its lowermost portion, means disposed in said needle valve assembly support plate for directing pressurized air at said gap to entrain powder thereat to provide an air-powder mixture, said powder feed orifice discontinuing powder flow therefrom upon absence of air flow from said means disposed in said needle valve assembly support plate, other means disposed in said support plate for receiving said air-powder mixture for transmission to said nozzle, an interiorly threaded adjusting collar for receiving said exteriorly threaded throttling needle therein, a base plate secured to an underside of said needle valve assembly support plate, said base plate having an opening for matingly receiving said non-circular head of said throttling needle, means for rotating said adjusting collar while said throttling needle is restrained from rotational movement by means of engagement of said non-circular head in said opening, said opening permitting vertical movement of said non-circular head therein and hence, vertical movement of said throttling needle in said central bore, said vertical movement of said throttling needle changing size of said gap for additionally controlling metering of said powder from said powder feed orifice.

2. Apparatus of claim 1 wherein a central raceway is provided exteriorly said powder feed orifice and interiorly said powder dispensing member, a ball disposed within said raceway for traversal therearound, said ball traversing on an upper surface of said needle valve assembly support plate, and means for causing said ball to traverse said raceway.

3. Apparatus of claim 1 wherein spring means is disposed axially within said needle valve assembly support plate to continuously urge said adjusting collar against upper surface of said base plate thereby maintaining accuracy of dimension of said gap and consequent powder flow rate.

4. Powder metering apparatus for metering powder to a conventional handpiece of an abrasive jet machining device and the like comprising:

powder containing means communicating with an axially disposed powder feed orifice therebelow including a powder hopper mounted to a dispensing member, said dispensing member having a funnel-shaped opening for receiving powder from said hopper and directing said powder downwardly through said powder feed orifice, a vertically adjustable throttling needle vertically aligned with said powder feed orifice to form a controlled gap space therebetween, means for horizontally directing pressurized air at said gap space to entrain powder entering said gap space from said powder feed orifice and to provide an air-powder mixture, means to receive said air-powder mixture for transmission to said handpiece said dispensing member being mounted upon a needle valve assembly support plate having an axial bore therethrough, said axial bore receiving said powder feed orifice at an upper portion thereof and said throttling needle at a lower portion thereof, said feed orifice and throttling needle forming said gap space therebetween, said axial bore forming a chamber embracing said gap space, and wherein said pressurized air directed at said gap space passes out from said chamber as an air-powder mixture for delivery to said means receiving said air-powder mixture for transmission to said handpiece, said means for horizontally directing pressurized air at said gap space and said means for receiving said air-powder mixture are respectively an internal nozzle connected to an air inlet, and an air outlet, both communicating with said chamber and disposed in said needle valve assembly support plate in substantially diametrical alignment, said throttling needle being flattened at an uppermost portion to thereby have a diameter thereat larger than opening of said powder feed orifice, said throttling needle being movable vertically within said axial bore by a needle valve assembly comprising said flattened throttling needle having an exteriorly threaded portion below said flattened portion, an internally threaded adjusting collar for threadedly receiving said throttling needle, means for rotating said adjusting collar, means for restraining rotation of said throttling needle while permitting its vertical movement, and means for controlling the size of said gap space by adjustment of vertical movement of said throttling needle.

5. Apparatus of claim 4 wherein said throttling needle includes a polygonally sided head at its lowermost portion, said means for restraining rotation comprises a base plate mounted to a lower surface of said needle valve assembly support plate, said base plate having a central bore therein for matingly receiving said polygonally sided head, and said means for rotating said adjusting collar comprises a control lever mounted thereto.

6. Apparatus of claim 4 wherein a central raceway is provided exteriorly said powder feed orifice and interiorly said dispensing member, a ball disposed within said raceway for traversal therearound, said ball traversing on an upper surface of said needle valve assembly support plate, and means for causing said ball to traverse said raceway.

* * * * *